United States Patent
Kaplan (10) Patent No.: US 9,158,114 B2
(45) Date of Patent: Oct. 13, 2015

(54) IMAGE DISPLAY UTILIZING A VARIABLE MASK TO SELECTIVELY BLOCK IMAGE DATA

(71) Applicant: Exelis Inc., McLean, VA (US)

(72) Inventor: David B. Kaplan, Vinton, VA (US)

(73) Assignee: Exelis Inc., McLean, VA (US)

( * ) Notice: Subject to any disclaimer, the term of this patent is extended or adjusted under 35 U.S.C. 154(b) by 333 days.

(21) Appl. No.: 13/668,671

(22) Filed: Nov. 5, 2012

(65) Prior Publication Data

US 2014/0125694 A1    May 8, 2014

(51) Int. Cl.
*G02B 26/02* (2006.01)
*G02B 27/01* (2006.01)
*G09G 5/14* (2006.01)

(52) U.S. Cl.
CPC .............. *G02B 27/01* (2013.01); *G02B 27/017* (2013.01); *G02B 26/02* (2013.01); *G09G 5/14* (2013.01)

(58) Field of Classification Search
CPC ......... G02B 26/02; G02B 5/005; G02B 27/01; G02B 27/011; G02B 27/0118
USPC .......................... 359/227, 629–639; 345/629
See application file for complete search history.

(56) References Cited

U.S. PATENT DOCUMENTS

| | | | | |
|---|---|---|---|---|
| 5,886,822 A | * | 3/1999 | Spitzer | 359/630 |
| 7,982,848 B2 | * | 7/2011 | Murata | 349/201 |
| 2003/0227602 A1 | * | 12/2003 | Scarasso | 353/122 |
| 2008/0266321 A1 | * | 10/2008 | Aufranc et al. | 345/626 |

* cited by examiner

*Primary Examiner* — Ricky Mack
*Assistant Examiner* — Kristina Deherrera
(74) *Attorney, Agent, or Firm* — Edell, Shapiro & Finnan LLC (57) ABSTRACT

A display apparatus includes a beam combiner receiving a first image projected by a source, and a second image. The beam combiner combines the first image and the second image into a third image. A variable mask is configured to mask portions of the second image from the beam combiner. A controller is configured to shape the variable mask according to the content of the first image.

21 Claims, 7 Drawing Sheets

IMAGE DISPLAY UTILIZING A VARIABLE MASK TO SELECTIVELY BLOCK IMAGE DATA

TECHNICAL FIELD

The present disclosure relates to image display devices, and in particular, user wearable image display devices such as augmented reality goggles and night vision goggles.

BACKGROUND

Wearable display devices, such as augmented reality goggles, display a combination of two images. For example, augmented reality goggles may combine the field of the view of the wearer with additional information, such as textual information about the wearer's location. In gaming applications virtual terrain, opponents and teammates may be combined with the real world environment of the wear's current field of view. Other wearable devices, such as night vision goggles, may combine a light-enhanced image with additional information, such as communication information or strategically important information, such as the location of enemy combatants.

However, in a wearable display device, the combination of two images may result in degradation of the features of the original images. For example, in an augmented reality gaming application, if the virtual terrain includes dark areas, but the user's field of view includes only bright images, the virtual information may appear completely washed out, or even invisible in the combined image.

DESCRIPTION OF EXAMPLE EMBODIMENTS

Overview

A display apparatus includes a beam combiner receiving a first image projected by a source, and a second image. The beam combiner combines the first image and the second image into a third image. A variable mask is configured to mask portions of the second image from the beam combiner. A controller is configured to shape the variable mask according to the content of the first image.

Example Embodiments

Figure 1:
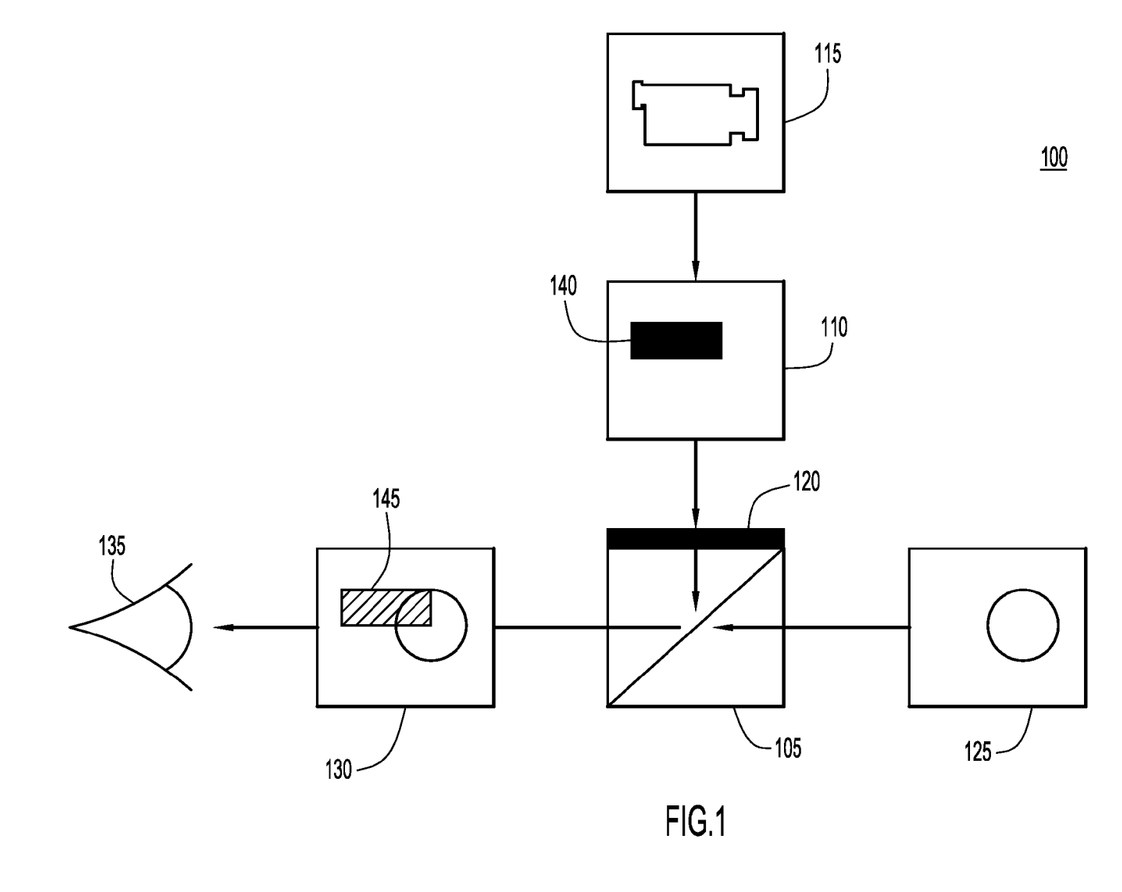
FIG. 1 is a depiction of an example image display device combining a first image and a second image.

Depicted in FIG. 1 is a display apparatus 100 comprising a beam combiner 105. Beam combiner 105 receives a first image 110 from a video source 115. Specifically, a projector 120, such as a liquid crystal display or an organic light emitting diode display, projects first image 110 into beam combiner 105. Beam combiner 105 also receives second image 125, which may comprise, for example, a user's field of view through a pair of augmented reality goggles or a second image from a second video source. First image 110 and second image 125 are combined in beam combiner 105 forming third image 130. Third image 130 is displayed to a user as indicated by eye 135.

In the example of FIG. 1, first image 110 include dark portion 140, while second image 125 is generally very bright, particularly in the areas of second image 125 which will overlap with dark portion 140 after being combined with first image 110 in beam combiner 105. Accordingly, in third image 130, portion 145, which corresponds to dark portion 140, appears washed out due to the brightness of second image 125. According to some examples, dark portion 140 may be completely washed out in third image 130, and therefore, completely invisible to user 135.

Figure 2:
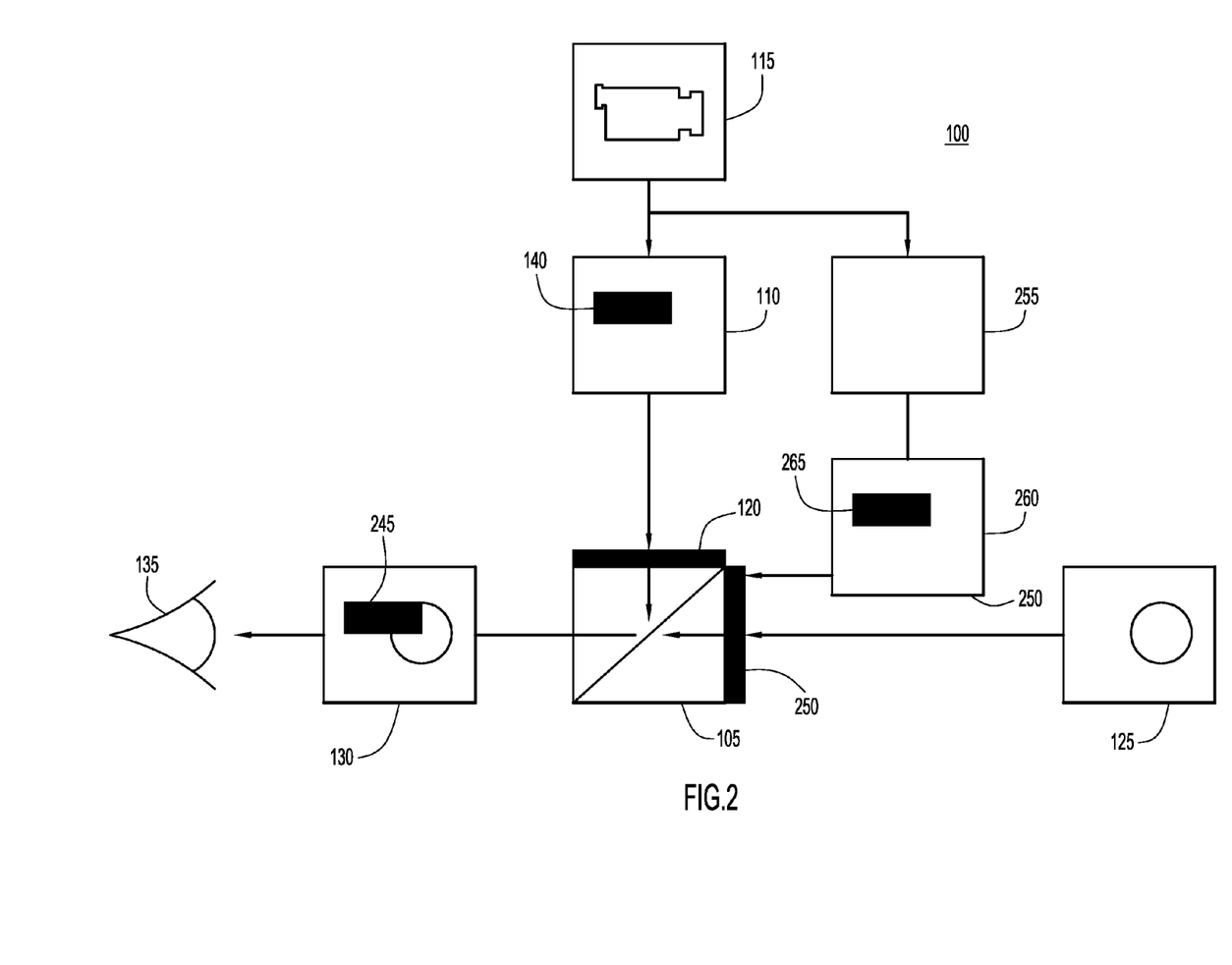
FIG. 2 is a depiction of a second example display device combining a first image and a second image.

With reference now made to FIG. 2, depicted therein is another example display apparatus 200. As in FIG. 1, beam combiner 105 receives a first image 110 from video source 115 through projector 120, and a second image 125. First image 110 and second image 125 are combined to form third image 130. Yet, unlike in apparatus 100 of FIG. 1, dark portion 140 of first image 110 does not appear washed out in third image 130. Instead, portion 245 of third image 130, which corresponds to dark portion 140, appears similarly dark in the combined third image 130. The preservation of dark portion 140 is accomplished through variable mask 250 and controller 255.

As depicted, variable mask 250 is placed in the path of the source of second image 125 and beam combiner 105. Variable mask 250 is comprised of transmissive portions 260 and non-transmissive portions 265. If non-transmissive portion 265 is arranged in the path of second image 125 such that it mask or blocks the portions of second image 125 that will overlap with dark portion 140 in combined image 130, dark portion 140 will not be washed out by the relatively brighter image of the corresponding portions of second image 125. In other words, the variable mask is used to provide localized dimming of portions of second image 125 that correspond to dark area 140 of the first image 110.

Non-transmissive portions 265 and transmissive portions 260 of variable mask 250 are controlled by controller 255. Specifically, controller 255 receives the same video signal that is sent to projector 120. By analyzing the video signal, controller 255 may determine which portions of image 110 comprise dark portions 140, and may then control variable mask 250 to become non-transmissive for portions of mask 250 corresponding to these areas. Accordingly, controller 255 receives the video signal corresponding to first image 110 and determines that first image 110 includes a dark portion 140. In response to this determination, controller 255 causes variable mask 250 to form non-transmissive portion 265 in an area corresponding to dark portion 140.

As variable mask 250 is placed within the path that second image 125 takes to enter beam combiner 105, the portions of second image 125 corresponding to non-transmissive portion 265 are blocked. Therefore, when beam combiner 105 combines first image 110 and second image 125, dark portion 140 will not be washed out because the bright portion of second image 125 corresponding to dark portion 140 has been blocked.

As illustrated, display device 200 utilizes a single beam combiner 105, a single projector 120, and a single variable mask 250. Other examples may use additional components. For example, an augmented reality goggle, in order to provide three dimensional virtual images, may use multiple projectors to send a slightly different version of the first image to each of a user's eyes. Accordingly, two beam combiners and two variable masks will be used to combine each version of the first image with the second image. In this example, it may be necessary for the non-transmissive portions of each variable mask to differ slightly. Similarly, if the first image contains only images to be projected into the user's peripheral vision, the first image may be projected into only one of the beam combiners. Accordingly, only one of the variable masks may be controlled to include a non-transmissive portion.

Video source 115 and controller 255 are illustrated as two separate components, though they may be implemented in a fewer or greater number of components. For example, a single processor may serve as both the video source 115 and the controller 255. According to other examples, such as implementations using multiple projectors and multiple variable masks, multiple controllers may be provided, with each controller servicing one of the variable masks.

Figure 3A:
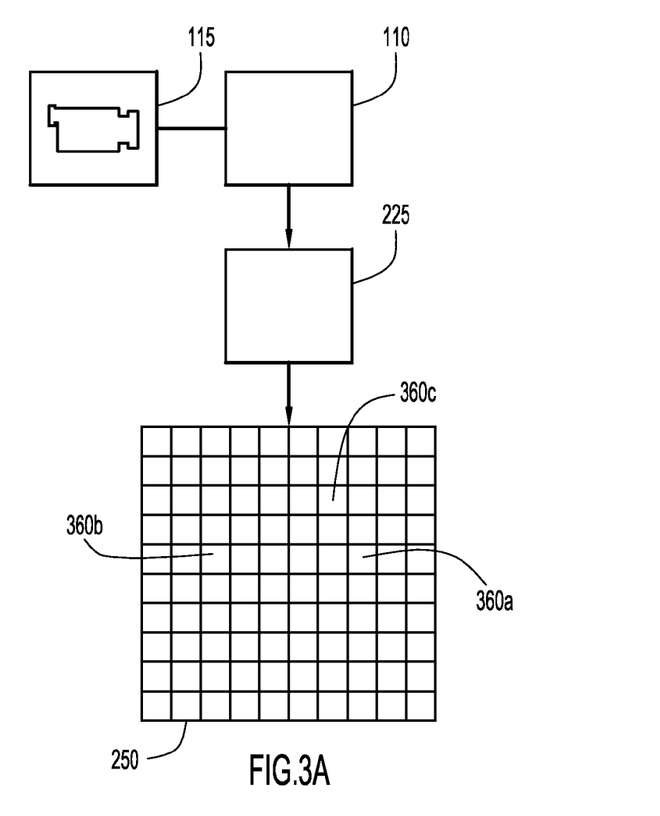
FIG. 3a is a depiction of a variable mask in a fully transmissive state.
Figure 3B:
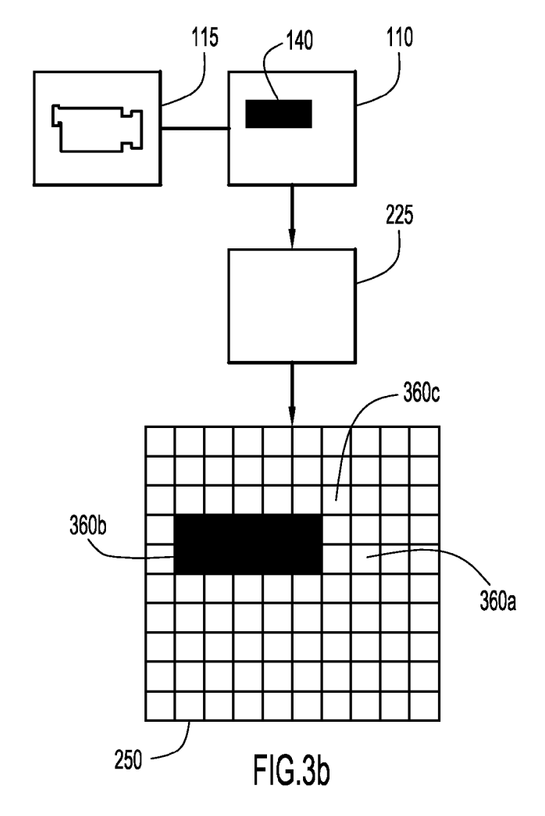
FIG. 3b is a depiction of a variable mask comprising transmissive and non-transmissive portions.

Turning to FIG. 3a and b, depicted therein is an expanded view of variable mask 250, as well as video source 115, first image 110 and controller 255. Variable mask 250 is comprised of a plurality of variable elements 360a-c which can be controlled by controller 255 to transform from a transmissive state to a non-transmissive state, and vice versa. If, as shown in FIG. 3a, first image 110 does not contain any dark areas, controller 255 will control all of the variable elements 360a-c to transform to or remain in the transmissive state.

On the other hand, when first image 110 include dark areas, as shown in FIG. 3b, controller 255 will control selected variable elements, such as variable element 360b and the surrounding elements, to transform such that areas of variable mask 250 corresponding to dark portion 140 are in a non-transmissive state.

According to some examples, the variable mask 250 is comprised of a liquid crystal matrix. Specifically, each transmissive element 360a-c may be comprised of a liquid crystal pixel in which liquid crystal molecules are sandwiched between transparent electrodes and perpendicularly arranged polarizers. By turning on and off the electrodes, the controller can cause the individual variable elements to transform from a transmissive state to a non-transmissive state, and vice versa. According to other examples, each variable element may be comprised of an adaptive optical element, such as a minor, a lens and other reflective and refractive optical elements. In this example, the controller 255 may control the adaptive optical element to direct incident light towards beam combiner 250 in the transmissive state, and away from beam combiner 250 in the non-transmissive state.

According to other examples, such as display devices implemented in night vision goggles, the variable mask may be located outside of the direct optical path of the second image. For example, some night vision goggles transform an optical image into an electron image, and then send the resulting electron image through a particle multiplier, such as a microchannel plate, to increase the intensity of the electron image. The electron image is then transformed back into an optical image for display to the user. In such an implementation, the variable mask may be placed in the path of the originally received optical image, the initial electron image, the intensified electron image, or the intensified optical image.

Figure 4:
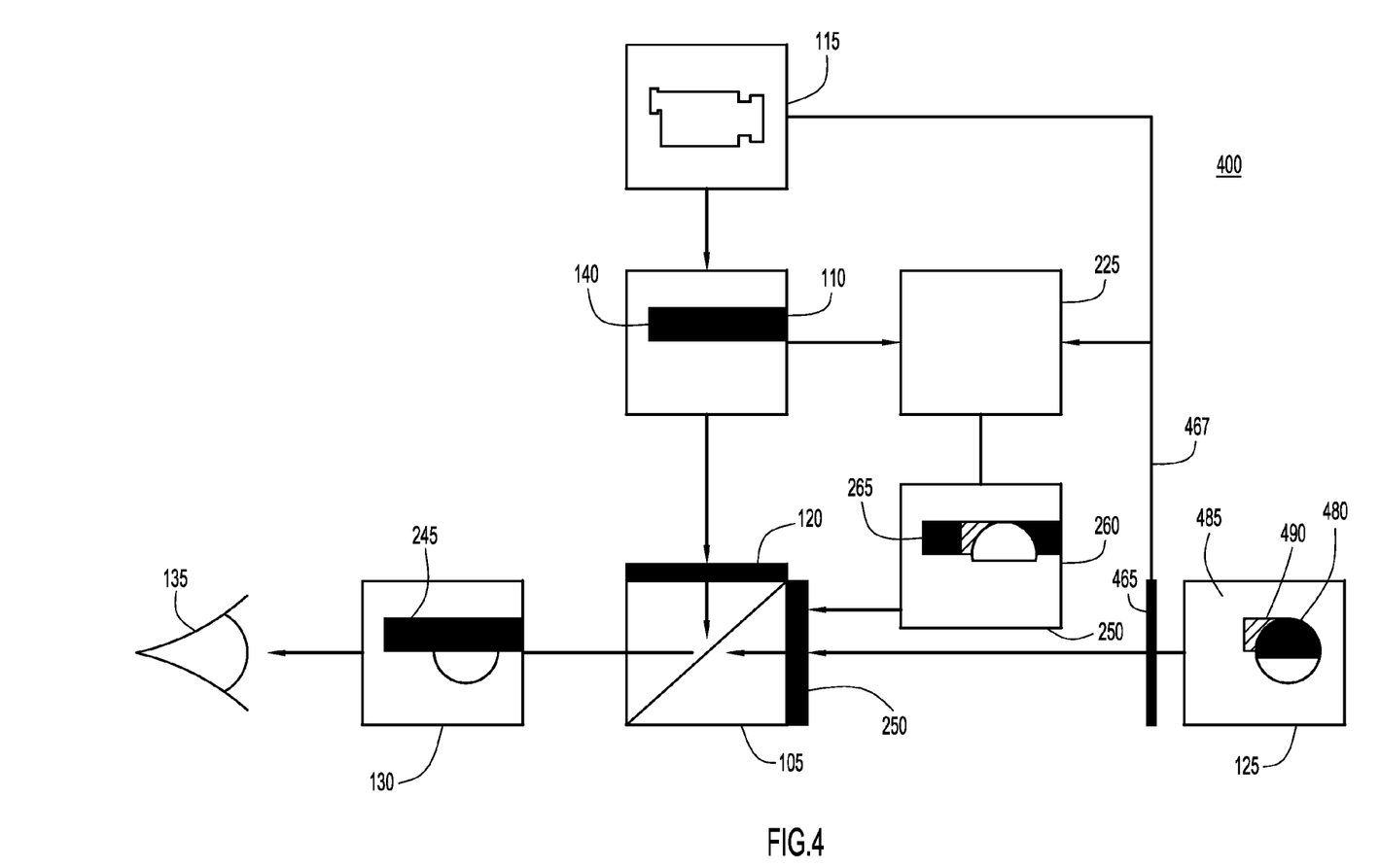
FIG. 4 is a depiction of a third example display device combining a first image and a second image.

With reference now made to FIG. 4, depicted therein is another example image display device 400. Image display device 400 is similar to the device illustrated in FIG. 2 in that it includes a variable mask 250 and a controller 255. Display device 400 further includes image signal source 465 providing image signal 467 which corresponds to the content of second image 125. In a night vision goggle implementation, the image signal source 465 may comprise the signal processing logic used to increase the brightness and contrast of the dark image being augmented. According to examples, image signal source 465 may comprise an image sensor used to determine the content of the image in a user's field of view. In other examples, the image signal source may comprise a video signal source if two video signals are to be combined in beam combiner 105.

By providing image signal 467, controller 255 may consider the content of both the first image and the second image in controlling variable mask 250. According to the example of FIG. 4, second image 125 contains dark portions 480, light portions 485, and moderately dark portions 490. By considering the content of second image 125, controller 255 may more accurately shape the non-transmissive portions of variable mask 250.

Specifically, as second image 125 includes dark portions 480 and light portions 485, it may be unnecessary to block the dark portions 480 to allow the dark portions 140 of first image 110 to be visible in third image 130. Because controller 255 has received image signal 467, it is aware of the portions of second image 125 that are already dark, and therefore does not make the corresponding portions of the variable mask 250 non-transmissive. Furthermore, there may be portions 490 of the second image that are only moderately dark. Accordingly, it may be necessary to make the corresponding portions of variable mask 250 only partially transmissive in order to successful prevent the washing out of the dark portion 140 of first image 110.

There may also be times when controller 255 will determine that the content of first image 110 should be partially obscured by portions of first image 125. For example, if the display device is implemented in augmented reality goggles, controller 255 may decide to purposefully allow some dark portions of first image 110 to be washed out by second image 125. If image 110 comprises terrain or opponents for a gaming application, even if these opponents or terrain are dark, controller 255 may still decide to allow portions of the image to be washed out by first image 125. For example, if image 110 provides a dark, imaginary background for an augmented reality application, bright real world foreground elements of second image 125 should be allowed to wash-out the dark background elements of image 110. Accordingly, controller 255 may take into account both the content of first image 110 and second image 125 when determining which portions of variable mask 250 to make non-transmissive.

Image display device 400 also provides image signal 467 to video source 115. Accordingly, not only may variable mask 250 be tailored according to the content of second image 125, but the content of first image 110 may also be tailored according to the content of second image 125. For example, if image display device 400 is implemented in augmented reality goggles for a gaming application, video source 115 may place opponents and teammates into first image 110 which appear to interact with the real world elements and terrain depicted in second image 125.

Figure 5:
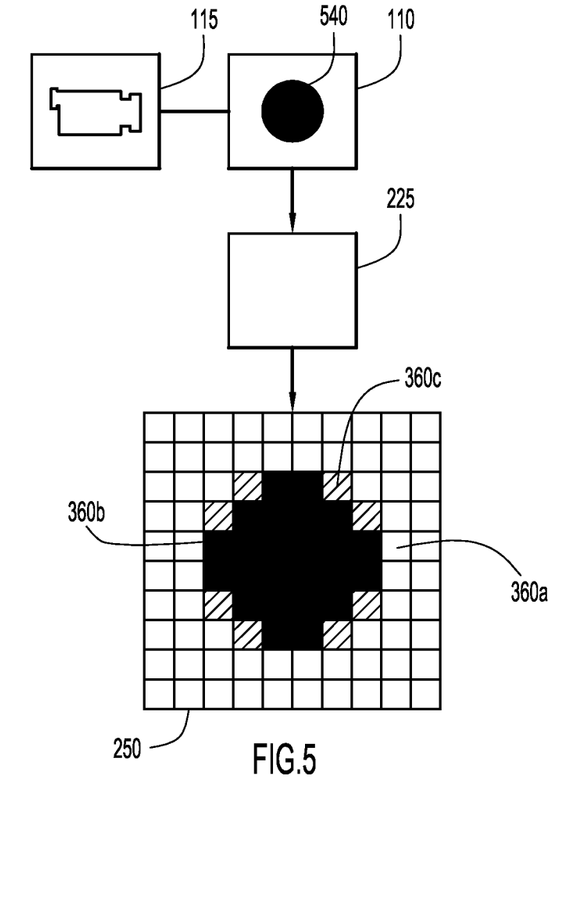
FIG. 5 is a depiction of a variable mask comprising transmissive, non-transmissive, and partially transmissive portions.

With reference now made to FIG. 5, depicted therein is a close-up of variable mask 250 which includes transmissive variable elements 360a, non-transmissive variable elements 360b, and partially transmissive variable elements 360c. As discussed above with reference to FIG. 4, variable elements 360c may be made partially transmissive to block portions of an image which are only moderately dark. Partially transmissive variable elements 360c may also be used to perform anti-aliasing with non-transmissive portions 360b.

Depending on the density of the variable elements in variable mask 250, the portions of an image blocked by non-transmissive portions 360b may appear pixelated in the combined image. In digital imaging, the edges of a pixelated image can be smoothed by placing pixels along a transition which combine the colors and intensities of the pixels on either side of the transition. A similar technique may be used in variable mask 250. By making variable elements partially transmissive along the transition from non-transmissive to transmissive variable elements, the edges of the blocked areas may be smoothed, eliminated some or all of the pixilation in the combined image.

For example, if non-transmissive portions 360b are attempting to block round dark portion 540 of image 110, the resulting non-transmissive portion may be a blocky, cross-like pattern due to the density of variable elements 360. In order to smooth the edges of the blocked portion in a resulting combined image, partially transmissive portions 360c may be used to anti-alias the edges of non-transmissive portions of variable mask 250.

Figure 6:
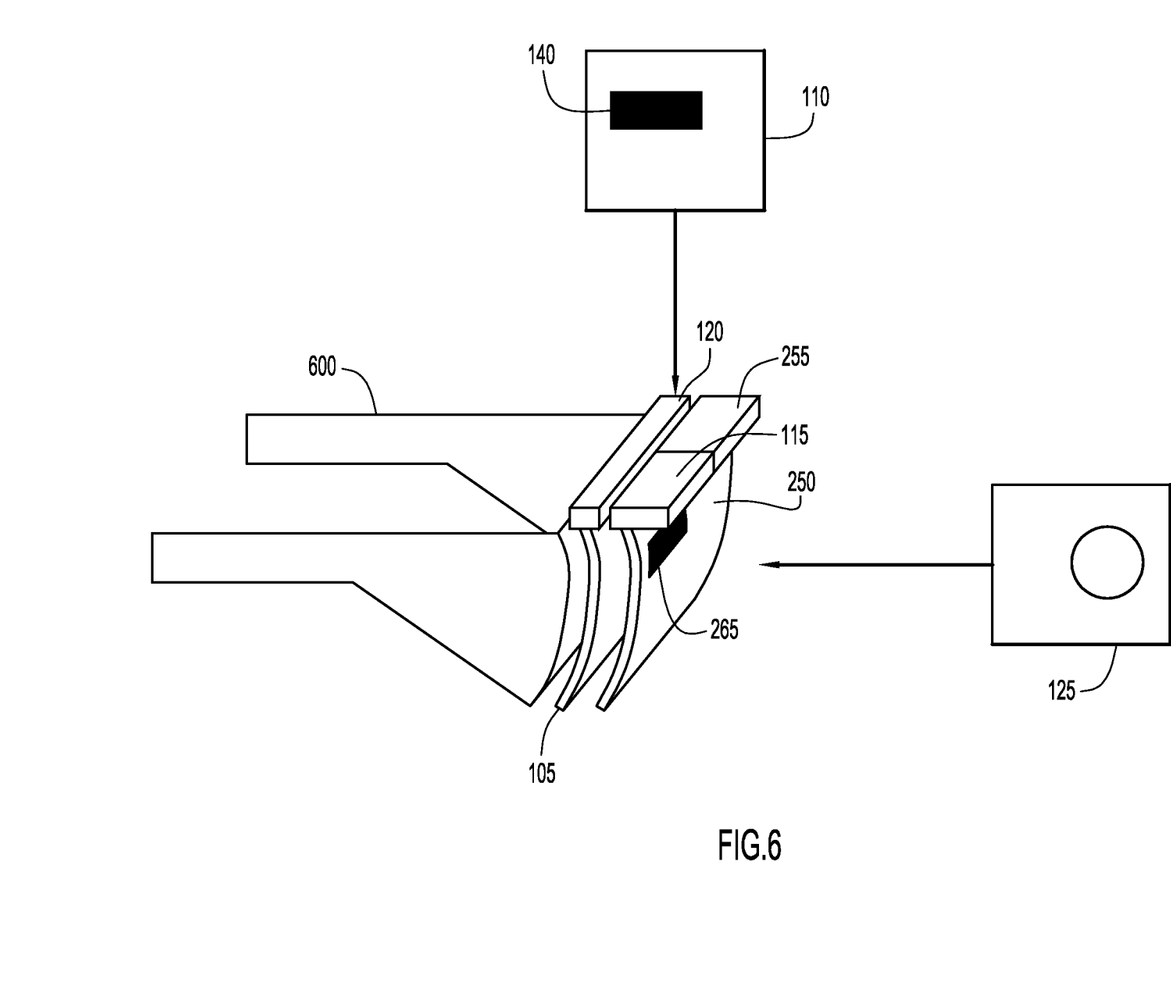
FIG. 6 is a depiction of a display device implemented in augmented reality goggles.

Turning to FIG. 6, depicted therein is an augmented reality goggle 600 implementing a display device as taught herein. Augmented reality goggles 600 are designed to be worn in front of a user's eyes like regular eyeglasses. Augmented images are then projected on to the lenses of the goggles. A beam combiner 105 is placed at the front of the goggles to combine a first image 110 produced by projector 120 and a second image 125 comprised of the user's field of view. The first image 110 may comprise images used to augment the real-world images of the second image 125. A variable mask 250 is placed in the user's field of view in front of the beam combiner 105.

Both controller 255 and projector 120 receive a video signal from video source 115. Projector 120 uses the video signal to project first image 110 into beam combiner 105, while controller 255 uses the video signal to determine if any portions of second image 125 should be blocked. Determining that portions of the second image 125 corresponding to dark portions 140 of first image 110 should be blocked, controller 255 causes portion 265 of variable mask 250 to become non-transmissive. Accordingly, a portion of the user's field of view which corresponds to portion 140 will be blocked by non-transmissive portion 265. With non-transmissive portion 265 blocking the light from image 125, dark portion 140 will not be washed out when first image 110 is combined with second image 125.

Figure 7:
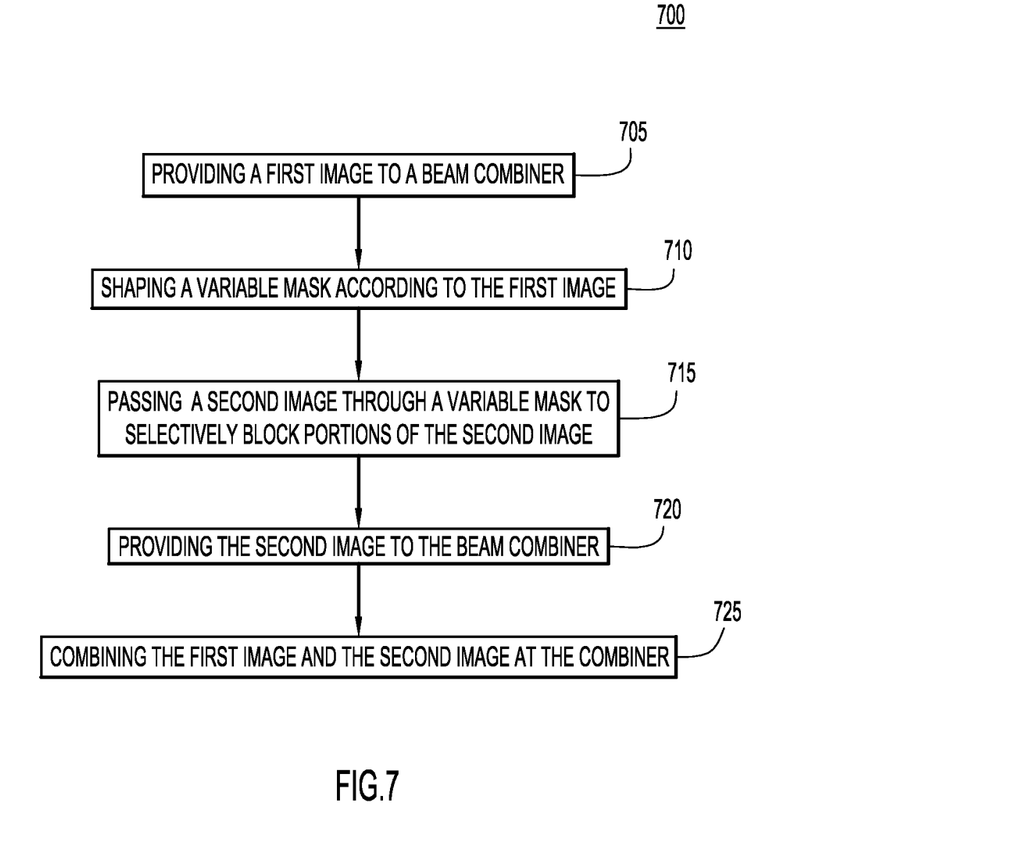
FIG. 7 is a flowchart illustrating a method for displaying an image combining a first image and a second image.

With reference now made to FIG. 7, depicted therein is flowchart 700 illustrating an image display method. The method starts in step 705 in which a first image is provided to a beam combiner. As discussed above, the first image may be projected into the beam combiner according to a video signal.

In step 710, a variable mask is shaped according to the first image. The variable mask may comprise a matrix of variable elements such as liquid crystal pixels. By transforming the variable elements from a transmissive state to a non-transmissive state, and vice versa, the mask can be selectively shaped to block portions of an image that passes through the mask. To control the shaping of the mask, a signal such as a video signal corresponding to the first image may be received by a controller. The controller may, in turn, transform the variable elements of the mask according to the video signal. For example, the controller may shape the non-transmissive portions of the variable mask to correspond to dark portions of the first image.

In step 715 a second image is passed through the variable mask to selectively block portions of the second image. For example, if the variable mask is shaped so that non-transmissive portions of the mask correspond to dark areas of the first image, areas of the second images corresponding to the dark areas of the first image will be selectively blocked.

In step 720, the second image is provided to the beam combiner. Specifically, the portions of the second image not selectively blocked by the variable mask enter the beam combiner.

Finally, in step 725, the first image and the second image are combined in the beam combiner. Accordingly, if the variable mask was shaped to block portions of the second image corresponding to dark areas of the first image, the first and second images will be combined without the dark areas of the first image being washed out by the corresponding areas of the second image.

The above description is intended by way of example only.

What is claimed is:

1. An apparatus comprising:
   a source projecting a first image;
   a beam combiner configured to combine the first image and a second image into a third image, wherein the beam combiner is arranged within a path of the second image to receive the second image;
   a variable mask configured to mask portions of the second image from the beam combiner; and
   a controller configured to shape the variable mask according to the content of the first image to mask portions of the second image corresponding to dark portions of the first image.

2. The apparatus of claim 1, wherein the mask comprises a liquid crystal matrix.

3. The apparatus of claim 1, wherein the mask comprises an array of variable elements, wherein in each of the variable elements is configured to change from a transmissive state to a non transmissive state.

4. The apparatus of claim 3, wherein each variable element is configured to reflect light away from the beam combiner in the non-transmissive state.

5. The apparatus of claim 3, wherein each variable element is configured to refract light away from the beam combiner in the non-transmissive state.

6. The apparatus of claim 3, wherein each variable element is configured to absorb light in the non-transmissive state.

7. The apparatus of claim 3, wherein each variable element is further configured to change to a partially transmissive state.

8. The apparatus of claim 1 wherein the controller is configured to receive a video signal corresponding to the first image, and shape the mask according to the video signal.

9. The apparatus of claim 1, further comprising a light sensor configured to measure light levels of the second image, and provide light level data to the controller.

10. The apparatus of claim 9, wherein the controller controls the variable mask according to the first image and the light level data.

11. The apparatus of claim 1, wherein the apparatus is implemented in a wearable display device.

12. The apparatus of claim 11, wherein the wearable display device comprises at least one of a night vision goggle or an augmented reality goggle.

13. The apparatus of claim 12, wherein the first image comprises computer generated application data.

14. The apparatus of claim 11, wherein the second image comprises a field of view of a user of the wearable device.

15. The apparatus of claim 1, further comprising a second projector, wherein the second projector projects the second image into the beam combiner.

16. A method comprising:
providing a first image to a beam combiner;
shaping a variable mask according to the first image;
passing a second image through the variable mask to selectively block portions of the second image; and
providing the second image to the beam combiner; and
combining the first image and the second image at the beam combiner,
wherein shaping the variable mask comprising shaping the mask to block areas of the second image that would otherwise be combined with dark areas of the first image.

17. The method of claim 16, wherein shaping the variable mask comprises selectively transitioning a variable element of the mask between a transmissive state and a non-transmissive state.

18. The method of claim 16, wherein shaping the variable mask comprises selectively transitioning portions of a liquid crystal matrix between a transmissive state and a non-transmissive state.

19. The method of claim 16, wherein shaping the variable mask comprises evaluating the first image and the second image.

20. The method of claim 16, wherein providing the first image comprises projecting the first image according to a video signal.

21. The method of claim 20, wherein shaping the variable mask comprises shaping the mask according to the video signal.

\* \* \* \* \*